(12) United States Patent
Masumoto

(10) Patent No.: US 8,144,343 B2
(45) Date of Patent: Mar. 27, 2012

(54) PRINTING APPARATUS AND AN IMAGE SUPPLY DEVICE USING PICTURE TRANSFER PROTOCOL HAVING A FUNCTION WHICH CHECKS ATTRIBUTE INFORMATION OF A FILE OBJECT MANAGED IN THE IMAGE SUPPLY DEVICE

(75) Inventor: Kazuyuki Masumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1185 days.

(21) Appl. No.: 11/678,184

(22) Filed: Feb. 23, 2007

(65) Prior Publication Data
US 2007/0201073 A1 Aug. 30, 2007

(30) Foreign Application Priority Data
Feb. 27, 2006 (JP) .................................. 2006-051167

(51) Int. Cl.
*G06F 3/12* (2006.01)
(52) U.S. Cl. ......... 358/1.13; 358/1.6; 358/1.9; 715/234; 715/239
(58) Field of Classification Search ................. 358/1.13, 358/1.14, 1.15
See application file for complete search history.

(56) References Cited

U.S. PATENT DOCUMENTS

2005/0057772 A1* 3/2005 Mikami et al. ............... 358/1.15
2005/0231753 A1* 10/2005 Mertama et al. ............. 358/1.15

FOREIGN PATENT DOCUMENTS

| JP | 11-112932 | | 4/1999 |
|---|---|---|---|
| JP | 2001-043043 | A | 2/2001 |
| JP | 2003-248614 | A | 9/2003 |
| JP | 2005-006012 | A | 1/2005 |
| JP | 2005-182253 | A | 7/2005 |

OTHER PUBLICATIONS

Dec. 3, 2010 Japanese Office Action, which is enclosed without an English Translation, that issued in Japanese Patent Application No. 2006-051167.

* cited by examiner

*Primary Examiner* — Benny Tieu
*Assistant Examiner* — Marcellus Augustin
(74) *Attorney, Agent, or Firm* — Cowan, Liebowitz & Latman, P.C.

(57) ABSTRACT

A printing apparatus according to a preferred embodiment of this invention receives, from an image supply device, a first script "DDISCVRY.DPS" that describes the print function of the image supply device. If the first script describes support for printing by XHTML, the printing apparatus determines whether printing corresponding to the description is possible. The printing apparatus transmits a second script "HDISCVRY.DPS" that describes a print function executable by the printer to the image supply device in accordance with the determination result.

4 Claims, 13 Drawing Sheets

FIG. 7A

```
<input>
    <getCapability>
        <capability>
            <layouts/>
        </capability>
    </getCapability>
</input>
```

FIG. 7B

```
<output>
    <result> 10000000 </result>
    <getCapability>
        <capability>
            <layouts>
                57000000 57010000 57020000
            </layouts>
        </capability>
    </getCapability>
</output>
```

FIG. 9

```
DDISCVRY.DPS

<xhtml-print>  ~911
    <printerfont> yes, no </printerfont>  ~912
    <encoding> utf-8, utf-16 </encoding>  ~913
    <print> mime multiplex, by reference </print>  ~914
    <version> 0.95, 1.0 </version>  ~915
    <enhanced layout> on, off </enhanced layout>  ~916
</xhtml-print>  ~917

<file id>  ~921
    <source> xxx/aaa. jpg = 00000001 </source>  ~922
    <source> xxx/bbb. jpg = 00000002 </source>  ~923
    <source> xxx/ccc. jpg = 00000003 </source>  ~924
                    :
</file id>  ~927
```

FIG. 10A

```
HDISCVRY.DPS

<xhtml-print>  ~ 931
    <printerfont> no </printerfont>  ~ 932
    <encoding> utf-8 </encoding>  ~ 933
    <print> by reference </print>  ~ 934
    <version> 1.0 </version>  ~ 935
    <enhanced layout> off </enhanced layout>  ~ 936
</xhtml-print>  ~ 937
```

FIG. 10B

```
HDISCVRY.DPS

<xhtml-print>
    <printerfont></printerfont>  ~ 942
    <encoding> utf-8 </encoding>  ~ 943
    <print></print>  ~ 944
    <version> 1.0 </version>  ~ 945
    <enhanced layout></enhanced layout>  ~ 946
</xhtml-print>
```

US 8,144,343 B2

PRINTING APPARATUS AND AN IMAGE SUPPLY DEVICE USING PICTURE TRANSFER PROTOCOL HAVING A FUNCTION WHICH CHECKS ATTRIBUTE INFORMATION OF A FILE OBJECT MANAGED IN THE IMAGE SUPPLY DEVICE

BACKGROUND OF THE INVENTION

1. Field of the Invention

The present invention relates to an image supply device such as a digital camera or a digital-camera-equipped cellular phone, a printing apparatus, and a printing system.

2. Description of the Related Art

In recent years, digital cameras, digital-camera-equipped cellular phones, and portable terminals capable of capturing an image by a simple operation and converting the obtained image into digital image data are widely used. To print a photo from an image captured by such a camera, normally, a personal computer (PC) receives the obtained digital image data from the camera, processes the data, and then outputs it to a color printer for printing. Recently, color printing systems (to be referred to as "direct printing" hereinafter) capable of transmitting digital image data directly from a camera to a color printer and printing it without an intervening PC are employed. See, e.g., Japanese Patent Laid-Open No. 11-112932. So-called photo-direct (PD) printers are also commercially available, which can directly load a memory card mounted in a camera to store captured images and print image data stored in the memory card.

Direct printing was previously a model-dependent print function, which only could be implemented between cameras and printers of the same maker. However, recent standardization in the industry is making the environment ripe for direct printing between cameras and printers of different makers. For example, PictBridge that is officially placed in the public domain by CIPA is a representative standard of direct printing between products of different makers. The PictBridge aimed mainly at wired connection via USB at first. However, products adaptable to wireless connection using TCP/IP have also been available lately.

Requirements for print functions implemented by direct printing are wide-ranging. For example, the demand is growing not only for a function of printing an image captured by a camera on a paper sheet, like a silver halide photo, but also for a function of printing an image together with a mail document, a document created by a wordprocessor, or a document with a complex layout such as a Web page. A print function using an XHTML document on a BPP protocol in Bluetooth® is an example of a technique of meeting this requirement.

As described above, the environment is becoming ripe for standardization of interface specifications and multifunctional equipment in direct printing. However, conventional direct printing aims at simple photo printing like a silver halide photo. The function is insufficient for printing a document including text information or a document with a complex layout such as a Web page. In addition, the conventional direct printing system has no means for exchanging detailed information representing the XHTML support state.

A printer that supports XHTML can receive and print an XHTML file without any problem. However, some printers do not offer full support because of restrictions on the ROM or RAM capacity or CPU performance. In this case, the camera must convert print data in accordance with the support state of the printer. For example, if a printer supports "mime multiplex" of XHTML, the camera encrypts image data, embeds it in an XHTML file, and transmits it to the printer. If a printer supports "print by reference", the camera describes the storage location of image data in an XHTML file as URI and transmits it to the printer. In this case, in case of necessity, the printer requests the image data of the camera by using the URI. That is, a printer must notify an image supply device such as a camera of its XHTML function support state.

To implement maker-independent XHTML printing, at least one of a camera and a printer must acquire its partner's capability information (to be referred to as Capability hereinafter) representing whether the partner has a function of interpreting XHTML. The conventional direct printing system has only a command to send Capability from a printer to a camera by one-way communication. It is impossible to send Capability from a camera to a printer.

The conventional system has trouble if a plurality of printers as connection targets exist around a camera. For example, assume that a user wants a camera to connect only to a printer supporting XHTML. The camera can acquire the Capability of each printer only when connection is established according to a predetermined communication protocol. Hence, icons representing completion of connection are displayed on both the camera and printer. The user may believe a printer to support XHTML even when it does not.

When a printer supports only "print by reference", the camera describes the storage location of image data in an XHTML file as URI and transmits it, as described above. In the conventional direct printing system, the printer that requests the camera to transfer image data must designate it as a file ID of PTP because the transport layer uses PTP. Hence, the camera must notify the printer in advance of link information between the file ID of PTP and the URI as the image data storage location in the camera.

SUMMARY OF THE INVENTION

In one aspect of the present invention, a printing apparatus which receives image data from an image supply device and prints, includes a reception unit configured to receive, from the image supply device, a first script that describes a print function supported by the image supply device, a determination unit configured to determine, when the first script received by the reception unit describes support for printing by XHTML, whether printing corresponding to the description is possible, a transmission unit configured to transmit, to the image supply device, a second script that describes a print function executable by the printing apparatus upon reception of the fist script by the reception unit, and a control unit configured to control to shift to a mode for receiving image data from the image supply device and printing if the determination unit determines that printing corresponding to the description is possible.

In another aspect of the present invention, an image supply device which supplies image data to a printing apparatus and causes the printing apparatus to print, includes a transmission unit configured to transmit, to the printing apparatus, a first script that describes a print function by XHTML supported by the image supply device, a reception unit configured to receive a second script that describes a print function of the printing apparatus and is transmitted from the printing apparatus in response to the first script transmitted by the transmission unit, a determination unit configured to determine, based on a description of the second script received by the reception unit, whether the printing apparatus can execute printing by XHTML from the image supply device, and a control unit configured to control to shift to a mode for transmitting print data by XHTML to the printing apparatus and causing the printing apparatus to print if the determination unit determines that printing by XHTML is possible.

In another aspect of the present invention, a printing system including an image supply device and a printing apparatus, which supplies image data from the image supply device to the printing apparatus and prints, comprising a first transmission unit configured to transmit, to the printing apparatus, a first script that describes a print function by XHTML supported by the image supply device, a determination unit configured to determine, when the first script received by printing apparatus describes support for printing by XHTML, whether printing corresponding to the description is possible, a second transmission unit configured to transmit, to the image supply device, a second script that describes a print function executable by the printing apparatus upon reception of the fist script by the reception unit, a decision unit configured to decide, based on a description of the second script, whether the printing apparatus can execute printing by XHTML from the image supply device, and a control unit configured to control to shift to a mode for transmitting print data by XHTML from the image supply device to the printing apparatus and printing if the decision unit decides that printing by XHTML is possible.

In another-aspect of the present invention, a control method of a printing apparatus which receives image data from an image supply device and prints, the method includes the steps of receiving, from the image supply device, a first script that describes a print function supported by the image supply device, determining, when the first script received in the receiving step describes support for printing by XHTML, whether printing corresponding to the description is possible, transmitting, to the image supply device, a second script that describes a print function executable by the printing apparatus upon reception of the fist script in the receiving step, and controlling to shift to a mode for receiving image data from the image supply device and printing if it is determined in the determining step that printing corresponding to the description is possible.

In another aspect of the present invention, a control method of a printing system including an image supply device and a printing apparatus, which supplies image data from the image supply device to the printing apparatus and prints, the method includes the steps of transmitting, to the printing apparatus, a first script that describes a print function by XHTML supported by the image supply device, determining, when the first script received by printing apparatus describes support for printing by XHTML, whether printing corresponding to the description is possible, transmitting, to the image supply device, a second script that describes a print function executable by the printing apparatus upon reception of the fist script by the printing apparatus, deciding, based on a description of the second script, whether the printing apparatus can execute printing by XHTML from the image supply device, and controlling to shift to a mode for transmitting print data by XHTML from the image supply device to the printing apparatus and printing if it is decided in the deciding step that printing by XHTML is possible.

Further features of the present invention will become apparent from the following description of exemplary embodiments with reference to the attached drawings.

BRIEF DESCRIPTION OF THE DRAWINGS

FIGS. 7A and 7B are views for explaining a detailed example of a method of causing the mobile terminal according to the embodiment of the present invention to acquire the Capability of the printer;

FIG. 9 is a view showing a description example of supported XHTML functions which are described in a file "DDISCVRY.DPS" by the mobile terminal according to the embodiment of the present invention;

FIGS. 10A and 10B are views showing data examples of a file "HDISCVRY.DPS" returned from the printer to the mobile terminal.

DESCRIPTION OF THE EMBODIMENT

A preferred embodiment of the present invention will be described in detail with reference to the accompanying drawings. The present invention is not limited by the disclosure of the embodiment and all combinations of the features described in the embodiment are not always indispensable to solving means of the present invention.

Figure 1:
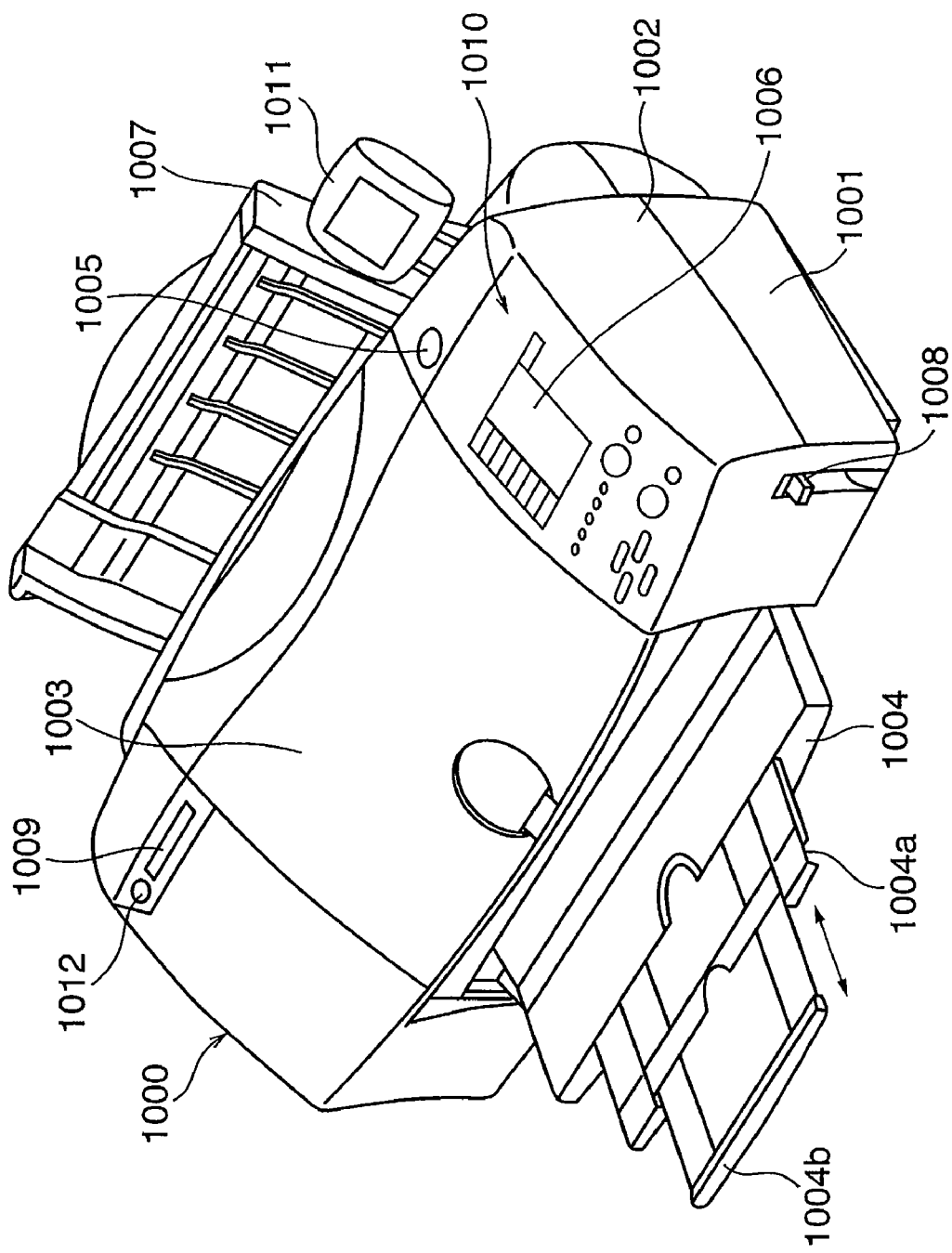
FIG. 1 is a schematic perspective view showing a photo-direct printer according to the embodiment of the present invention.

FIG. 1 is a schematic perspective view showing a photo-direct printer (to be simply referred to as a printer hereinafter) 1000 according to an embodiment of the present invention. The printer 1000 has a normal PC printer function of receiving data from a host computer (PC) and printing it and a function of directly reading and printing image data stored in a storage medium such as a memory card. The printer 1000 also has a function of receiving and printing image data from a mobile terminal such as a digital camera or digital-camera-equipped cellular phone serving as an image supply device.

Referring to FIG. 1, the main body that forms the casing of the printer 1000 according to the embodiment has casing members: a lower case 1001, upper case 1002, access cover 1003, and document output tray 1004. The lower case 1001 forms almost the lower half of the printer 1000, whereas the upper case 1002 forms almost the upper half of the main body. These cases combine and form a hollow structure with a storage space to store mechanisms (to be described later). The upper and front surfaces have openings. The lower case 1001 rotatably holds the document output tray 1004 at one end. As the document output tray 1004 rotates, the opening in the front surface of the lower case 1001 opens/closes. Upon printing, the document output tray 1004 rotates to the front side and opens to output print sheets from the opening and sequentially stack the output print sheets. The document output tray 1004 houses two auxiliary trays 1004a and 1004b. The print sheet support area can be increased/reduced in a plurality of steps by pulling out the trays to front side, as needed.

The upper case 1002 holds the access cover 1003 at one end so as to open/close the opening formed in the upper surface. Opening the access cover 1003 enables exchanging a printhead cartridge (not shown), ink tank (not shown), or the like stored in the main body. A projection (not shown) formed on the back surface of the access cover 1003 rotates a cover opening/closing lever when the access cover 1003 opens/closes. The lever rotation position is detected by, e.g., a microswitch to detect the open/closed state of the access cover 1003.

The upper case 1002 has a power key 1005 on its upper surface. The upper case 1002 has, on its right side, an operation panel 1010 with a liquid crystal display 1006 and various kinds of key switches. The structure of the operation panel 1010 will be described later in detail with reference to FIG. 2. An automatic document feeder (ADF) 1007 automatically feeds print sheets into the device main body. A paper interval selection lever 1008 adjusts the interval between the printhead and print sheets. A card slot 1009 receives an adapter capable of mounting a memory card. The printer can directly receive, via the adapter, image data stored in the memory card and print it. Examples of the memory card (PC) are a compact Flash® memory, smart media, and memory stick. A viewer (liquid crystal display) 1011 is detachable from the main body of the printer 1000. The viewer 1011 displays every frame image or index images when the user wants to search for a print target from images stored in the PC card. A USB terminal 1012 connects a mobile terminal (4000 in FIG. 3) (to be described later). The printer 1000 has, on its back surface, a USB connector to connect a personal computer (PC).

Figure 2:
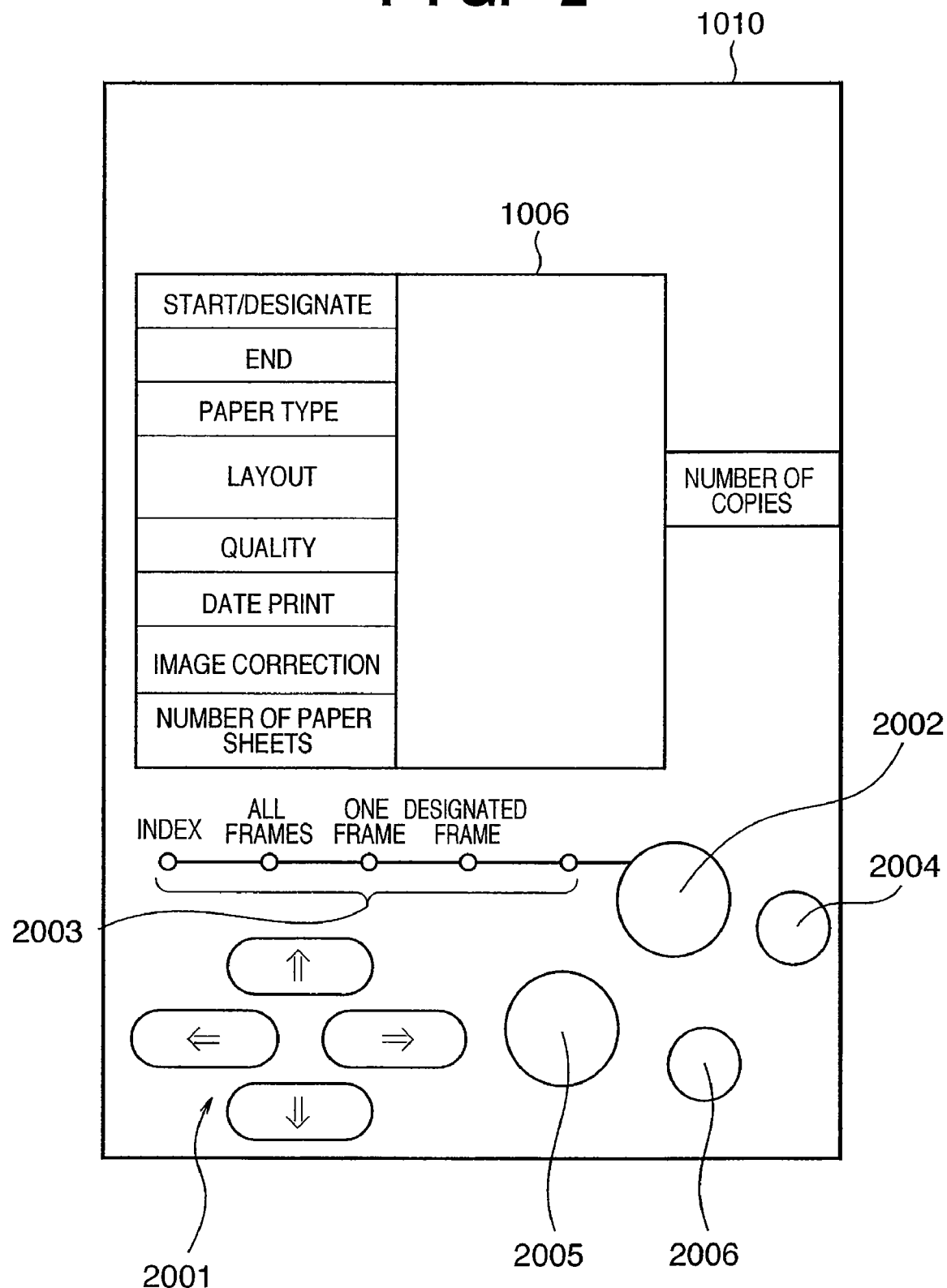
FIG. 2 is a view for explaining the schematic arrangement of the operation panel of the printer according to the embodiment of the present invention.

FIG. 2 is a view for explaining the schematic arrangement of the operation panel 1010 of the printer 1000 according to the embodiment.

Referring to FIG. 2, the liquid crystal display 1006 displays menu items to set various data about items printed on its right and left sides. An example of the displayed items is (start/designate) to designate the number of the first photo image to be printed and photo numbers in a plurality of photo image data. "End" designates the number of the last photo image to be printed. "The number of copies" designates the number of copies to be printed. "Paper type" designates the type of paper sheets (print sheets) used for printing. "Layout" sets the number of photos to be printed on one paper sheet. "Quality" designates the quality of an image to be printed to, e.g., high, standard, and draft. "Date print" designates whether to print the image capturing date. "Image correction" designates whether to correct an image. "Number of paper sheets" sets the number of paper sheets necessary for printing. The user selects or designates these items by using cursor keys 2001. The user can switch the type of printing (e.g., index print, all frame print, and one frame print) by pressing a mode key 2002. One of LEDs 2003 lights up in correspondence with the selected mode. A maintenance key 2004 is used for printer maintenance to, e.g., clean the printhead. The user presses a print start key 2005 to give the instruction for the start of printing or to establish maintenance setting. The user presses a print stop key 2006 to stop printing or give the instruction to stop maintenance.

Figure 3:
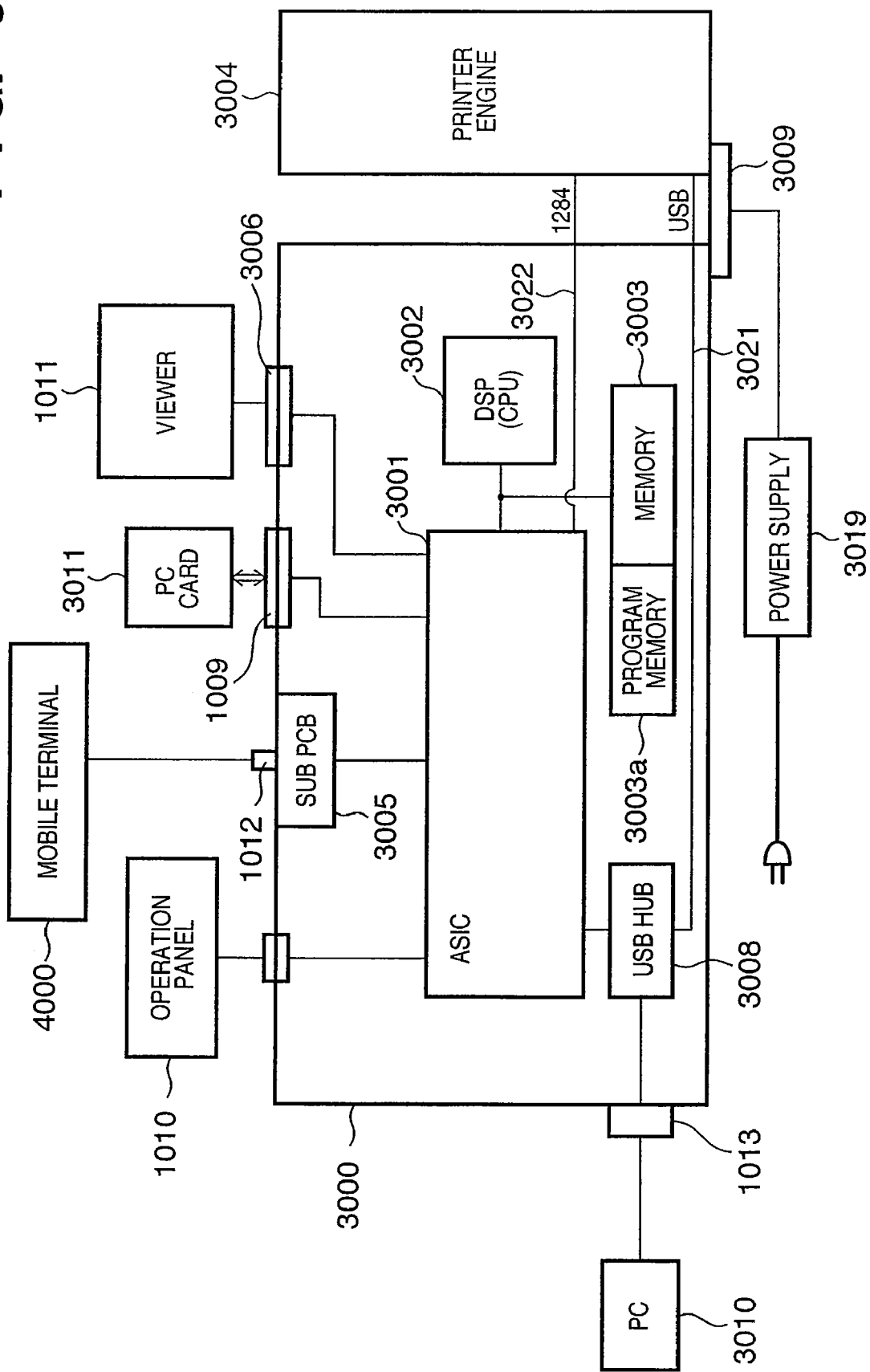
FIG. 3 is a block diagram for explaining the arrangement of the main part related to control of the printer according to the embodiment of the present invention.

FIG. 3 is a block diagram for explaining the arrangement of the main part related to control of the printer 1000 according to the embodiment. The same reference numerals as in the foregoing drawings denote the same parts in FIG. 3, and a description thereof will be omitted.

Reference numeral 3000 denotes a controller (control board); and 3001, an ASIC (Application Specific Integrated Circuit). A DSP (Digital Signal Processor) 3002 incorporates a CPU and performs various kinds of control processes to be described later, and image processes such as conversion from a luminance signal (RGB) to a density signal (CMYK), scaling, gamma conversion, and error diffusion. A memory 3003 has a program memory 3003a to store the control program of the CPU of the DSP 3002, a RAM area to store programs in running, and a memory area functioning as a work memory to store, e.g., image data. A printer engine 3004 here includes an ink-jet printer engine that prints a color image by using a plurality of color inks. A USB connector 3005 serves as a port to connect the mobile terminal 4000. A connector 3006 connects the viewer 1011. A USB hub 3008 passes through data from a PC 3010 and outputs it to the printer engine 3004 via a USB 3021 when the printer 1000 prints based on image data from the PC 3010. The connected PC 3010 can directly exchange data and signals with the printer engine 3004 and execute printing (functions as a general PC printer). A power connector 3009 receives, from a power supply 3019, a DC voltage converted from a commercial AC voltage. The PC 3010 is a general personal computer. Reference numeral 3011 denotes a memory card (PC card) described above.

Signal exchange between the controller 3000 and the printer engine 3004 is performed via the above-described USB 3021 or an IEEE1284 bus 3022.

Figure 4:
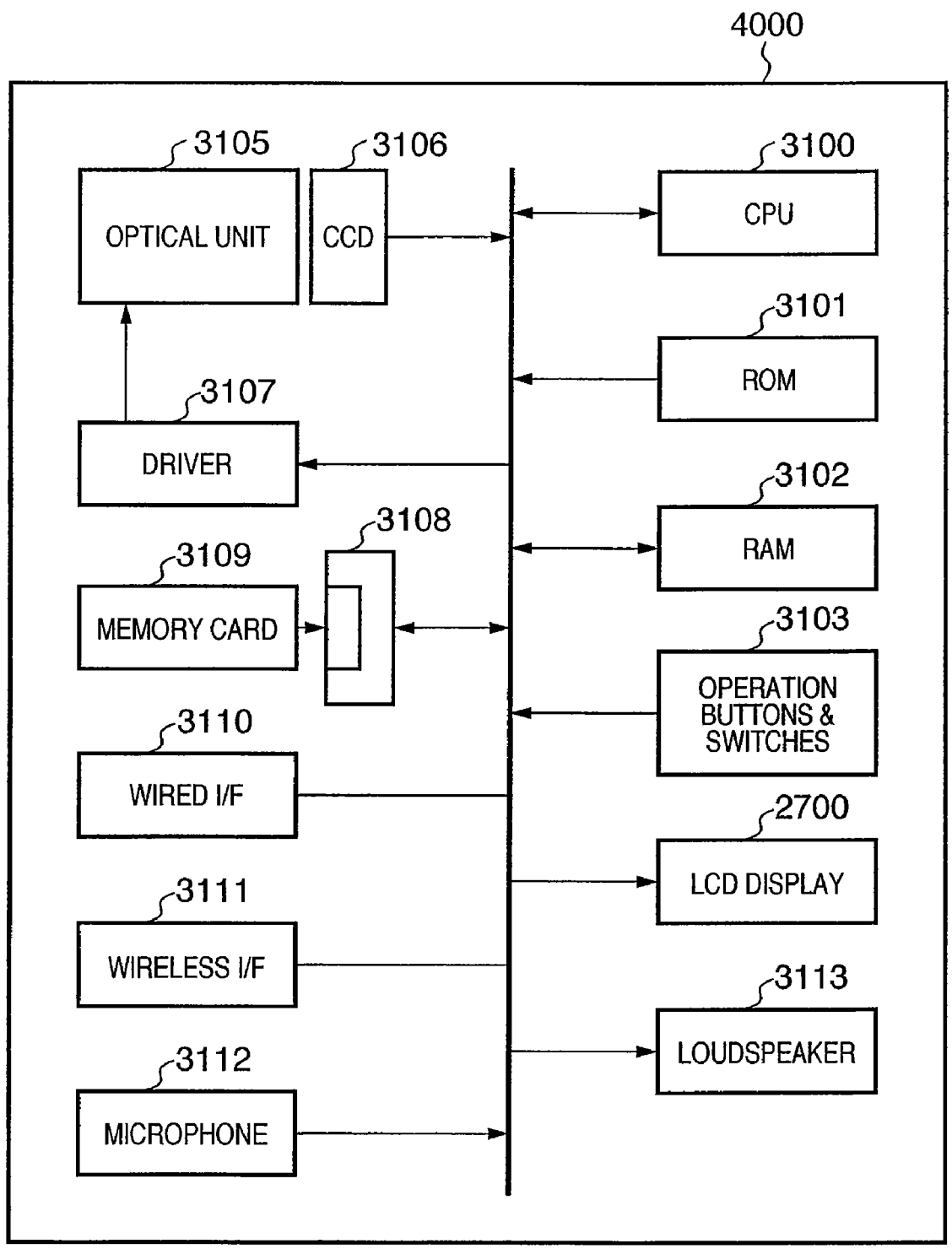
FIG. 4 is a block diagram showing the arrangement of a mobile terminal according to the embodiment of the present invention.

FIG. 4 is a block diagram showing the arrangement of the mobile terminal 4000 according to the embodiment. In this embodiment, the mobile terminal 4000 is a general term for a digital camera and digital-camera-equipped cellular phone.

Referring to FIG. 4, a CPU 3100 controls the entire mobile terminal 4000. A ROM 3101 stores a process procedure (program) of the CPU 3100. A RAM 3102 serves as the work area of the CPU 3100 and stores various kinds of data. Operation buttons and switches 3103 including switches and cursor keys are operated by the user to execute various operations. A liquid crystal display 2700 is used to display an image that is being currently captured, an image captured and stored, or menus for various kinds of settings. An optical unit 3105 mainly includes a lens and its driving system. A CCD element 3106 converts an image formed by light incident via the optical unit 3105 into an electrical signal. A driver 3107 drives and controls the optical unit 3105 under the control of the CPU 3100. A connector 3108 exchanges signals with a storage medium 3109 (e.g., compact Flash® memory card or smart media). A USB interface 3110 (slave side of USB) connects to the PC 3010 or printer 1000 according to the embodiment. A wireless I/F 3111 is used by the cellular phone to communicate with a base station. The user uses a microphone 3112 and a loudspeaker 3113 for speech communication.

Figure 5:
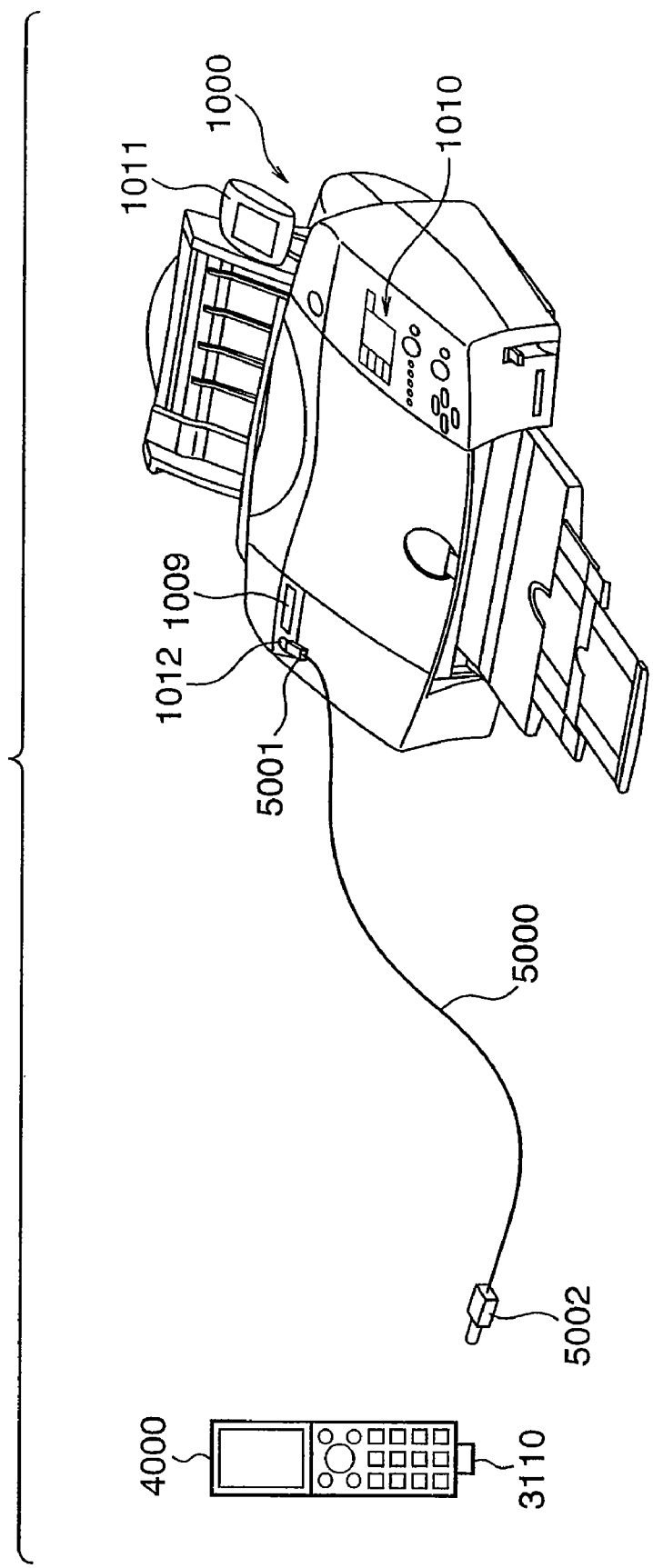
FIG. 5 is a view for explaining connection between the printer and the mobile terminal according to the embodiment of the present invention.

FIG. 5 is a view for explaining connection between the printer 1000 and the mobile terminal 4000 according to the embodiment. The same reference numerals as in the foregoing drawings denote the same parts in FIG. 5, and a description thereof will be omitted.

Referring to FIG. 5, a cable 5000 has a connector 5001 connected to the connector 1012 of the printer 1000, and a connector 5002 connected to the wired interface 3110 of the mobile terminal 4000. The mobile terminal 4000 can output image data saved in the internal memory to the printer 1000 via the wired interface 3110. The mobile terminal 4000 can employ various arrangements by, e.g., incorporating a memory serving as a storage unit or providing a slot to receive a removable memory (memory card) shown in FIG. 4. When the printer 1000 connects to the mobile terminal 4000 via the cable 5000 as shown in FIG. 5, the printer 1000 can directly print image data from the mobile terminal 4000. It is also possible to make the printer 1000 print image data directly transmitted from the mobile terminal 4000 via the wireless interface 3111.

An operation example of the printing system according to the embodiment based on the above-described arrangement will be described below.

The outline of the operation of the printing system including the mobile terminal 4000 and printer 1000 based on the above-described arrangement will be described below. In the printing system according to this embodiment, each of the mobile terminal 4000 and printer 1000 can perform an operation complying with a procedure DPS (Direct Print System) according to the embodiment.

Figure 6A:
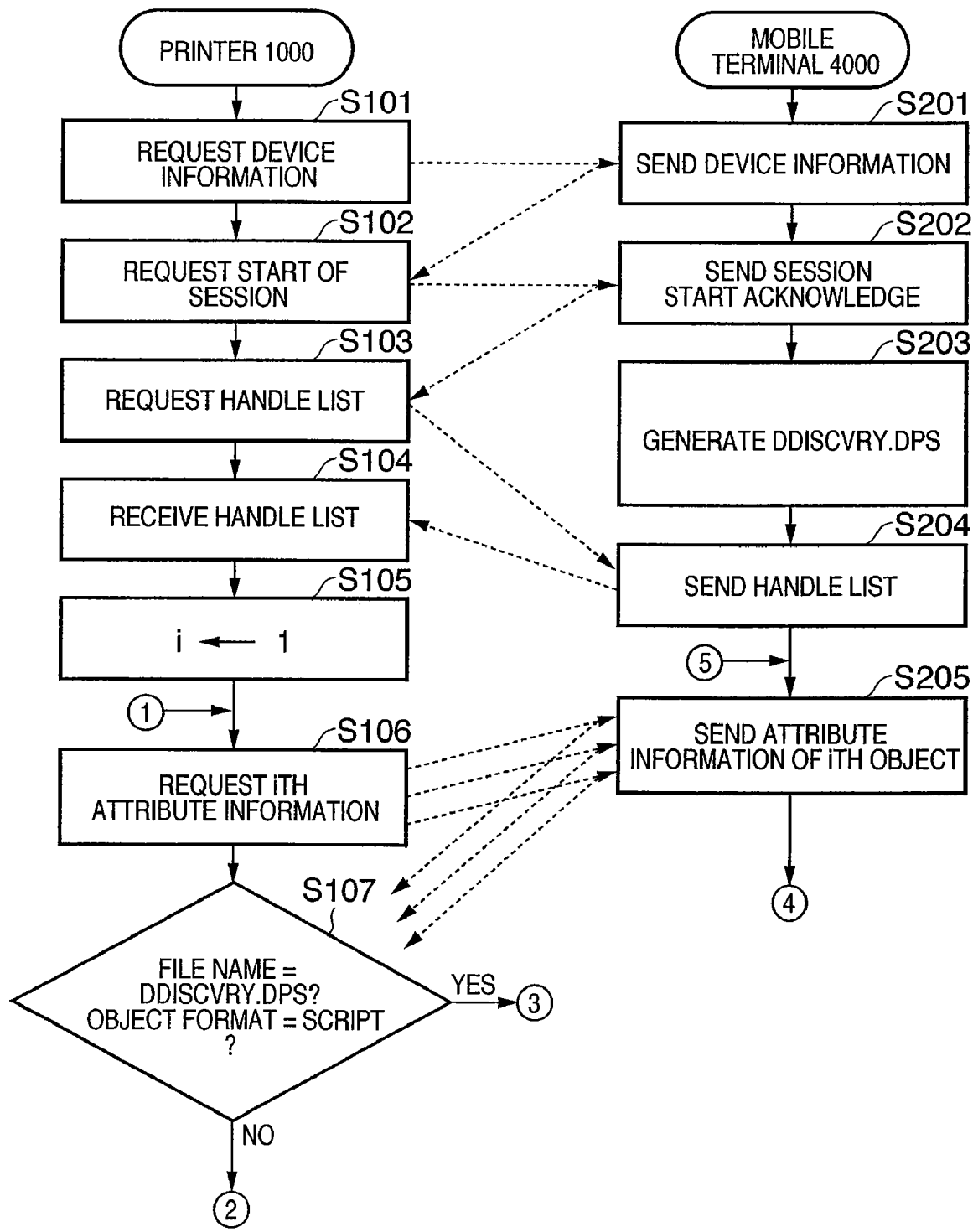
FIGS. 6A and 6B are flowcharts for explaining a procedure of causing the mobile terminal and printer to confirm each other's function in the direct printing system according to the embodiment of the present invention.
Figure 6B:
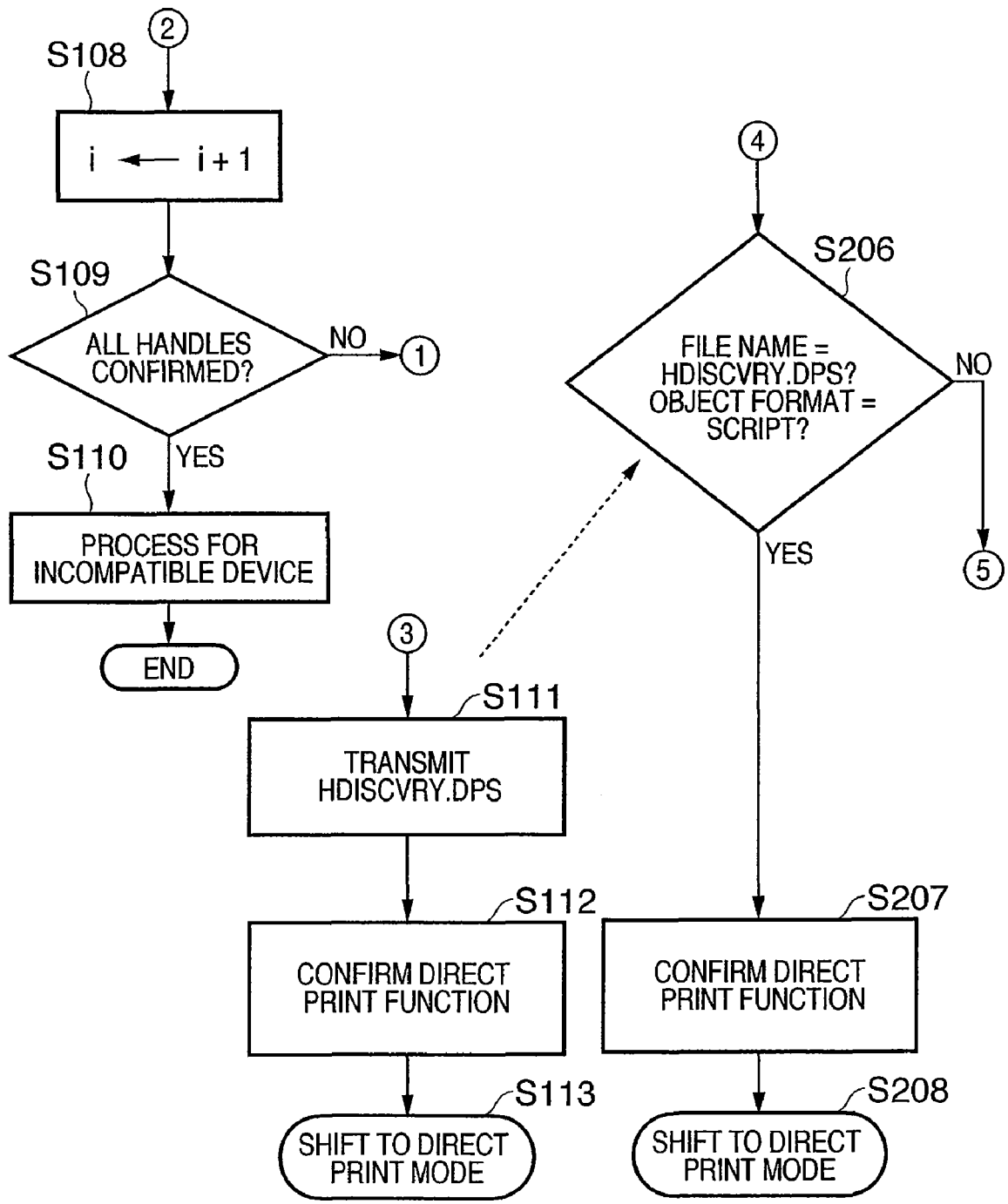

FIGS. 6A and 6B are flowcharts for explaining a procedure of causing the mobile terminal 4000 and printer 1000 to confirm each other's function in the direct printing system according to the embodiment.

In this embodiment, a standard protocol PTP defined by PIMA (Photographic and Imaging Manufacturers Association) is used for mutual communication between the mobile terminal 4000 and the printer 1000. In the following description, expressions enclosed in brackets, [ ] indicate instruction names in PTP such as data set names and PTP operation names corresponding to processes.

In step S101, the printer 1000 outputs a device information request [GetDeviceInfo] to the mobile terminal 4000. In step S201, the mobile terminal 4000 sends information representing the attribute of its own to the printer 1000 in response to the request [DeviceInfoDataSet]. This information is attribute information about the mobile terminal 4000 defined by the PTP standard and includes no information about the direct print function.

In step S102, the printer 1000 declares the start of a session [OpenSession]. Upon receiving this declaration, the mobile terminal 4000 sends a session start acknowledge to the printer 1000 in step S202. In step S203, the mobile terminal 4000 generates a file object "DDISCVRY.DPS" i.e., information indicating that the terminal supports the direct print function and allocates a handle to the generated object.

Upon receiving the session start acknowledgement from the mobile terminal 4000, the printer 1000 requests a handle list of objects held by the mobile terminal 4000 in step S103 [GetObjectHandles]. In step S204, the mobile terminal 4000 sends, to the printer 1000, a handle list [ObjectHandleArray] allocated to the objects (images and scripts) held by it. This handle list includes the handle allocated to the object corresponding to function recognition information generated in step S203. The handle list represents the number of clusters (objects) of data such as image data and text data managed by the mobile terminal 4000. In step S104, the printer 1000 receives the handle list.

In step S105, the printer 1000 determines the number (N) of handles from the information received in step S104. The printer 1000 substitutes an initial value "1" into a variable i indicating a handle. In step S106, the printer 1000 requests attribute information about the ith object of the mobile terminal 4000 [GetObjectInfo (Handle i)].

In response to the request from the printer 1000, the mobile terminal 4000 transmits the attribute information [ObjectInfo Dataset] of the corresponding object to the printer 1000 in step S205.

In step S107, the printer 1000 receives the attribute information of the object and confirms the contents. In this case, the printer 1000 determines whether the file name of the object corresponding to the value of the variable i is "DDISCVRY.DPS", and the object format is "script". If the result is YES in step S107, the process advances to step S111. At this point in time, the printer 1000 can recognize that the connected partner device supports the direct print function. In step S111, the printer 1000 notifies the mobile terminal 4000 that the printer supports the direct print function. In this case, the printer 1000 generates a file "HDISCVRY.DPS", i.e., information indicating that the printer supports the direct print function. The printer 1000 transmits the attribute information [SendObjectInfo] of the generated object to the mobile terminal 4000. Upon completing attribute information transmission, the process advances to step S112. The printer 1000 determines that the direct print function is successfully confirmed. In step S113, the printer 1000 shifts to a direct print mode. When shifting to the direct print mode, the printer 1000 displays a predetermined icon on the attached display. This allows the user to recognize that the printer has shifted to the direct print mode.

If the result is NO in step S107, the process advances to step S108. This indicates that the file name is not "HDISCVRY.DPS", or the object format indicates an object (e.g., captured image) except "script". The variable i is incremented by one in step S108. In step S109, the printer 1000 determines whether the attributes of all handles are confirmed, i.e., whether confirmation is done a number of times equal to the number (N) of handles received in step S104. If the attributes of all handles are not confirmed yet, the process returns to step S106 to repeat the above-described process. If the attributes of all (N) handles are confirmed in step S109, the process advances to step S110. This indicates that the printer has determined that the mobile terminal 4000 of the connected partner holds no script with the file name "DDISCVRY.DPS". In this case, the printer 1000 determines that the mobile terminal 4000 does not support the direct print function, and executes a process for an incompatible device to finish the process. For example, the LED provided on the operation panel 1010 is turned on to notify the user of the error, or a message indicating that function confirmation has failed is displayed on the display 1006. Then, the process is completed.

After transmitting the attribute information of the ith object in step S205, the mobile terminal 4000 receives the attribute information transmitted from the printer 1000 in step S206. In this case, the mobile terminal 4000 determines whether the file name of the received attribute information is "HDISCVRY.DPS", and the object format is "script". If the result is NO in step S206, the process returns to step S205 to wait for the next object attribute information request. If the result is YES in step S206, the process advances to step S207. The mobile terminal 4000 determines that the direct print function is successfully confirmed. In step S208, the mobile terminal 4000 shifts to the direct print mode. When shifting to the direct print mode, the mobile terminal 4000 also displays a predetermined icon on the attached display. This allows the user to recognize that the mobile terminal 4000 has shifted to the direct print mode.

FIGS. 7A and 7B are views for explaining a detailed example of a script for causing the mobile terminal 4000 according to the embodiment to acquire the Capability of the printer 1000.

FIG. 7A is a view showing a detailed example of an XML document to cause the mobile terminal 4000 to request the Capability of the printer 1000 More specifically, <getCapability> describes that the request is a Capability acquisition request. The mobile terminal 4000 inquires of the printer

1000 about a function designated by <capability>, i.e., a function about layout (<layout/>).

FIG. 7B is a view showing a detailed example of an XML document returned from the printer 1000 in response to the Capability request in FIG. 7A.

In this embodiment, the Capability about layout is transmitted by an 8-digit code, as is apparent from FIG. 7B. The two upper digits of the code, "57", specify the layout function. The next two digits indicate layout information representing the number of images printable on one print sheet. A code "5701" indicates that layout printing with one image printed on one print sheet is possible. A code "5702" indicates a layout print function of printing two images on one print sheet. A code "5700" indicates a print mode with default layout of the printer 1000. That is, in the example shown in FIG. 7B, the Capability of the printer 1000 about layout printing supports three kinds of layout printing, i.e., single image print (1in1), double image print (2in1), and default layout print of the printer 1000.

Transmission/reception of Capability about layout printing has been described above. Any other print function can be confirmed in the same manner. For example, it is possible to confirm Capability about the print sheet type supported by the printer 1000 and Capability about the print sheet size printable by the printer 1000. It is also possible to confirm Capability about the image data file type supported by the printer 1000 and Capability about a printer's function of adding a date or file name to an image. Various other Capabilities can be confirmed, including Capability about a print mode supported by the printer and Capability about the presence/absence of an automatic correction function for an image supported by the printer. A description of detailed communication specifications will be omitted here.

Data exchange between the mobile terminal 4000 and the printer 1000 according to the embodiment will be described next with reference to FIGS. 8A and 8B. Before establishing communication connection, the mobile terminal 4000 and printer 1000 exchange discovery files to mutually authenticate whether they are devices supporting direct printing. They describe necessary information directly in the discovery files and bidirectionally exchange them, thereby exchanging detailed information representing whether they support printing using an XHTML file and information representing the support state. A method of causing the mobile terminal 4000 to notify the printer 1000 of the association between file IDs of PTP and URIs as image data storage locations on the mobile terminal 4000 will also be described.

Figure 8A:
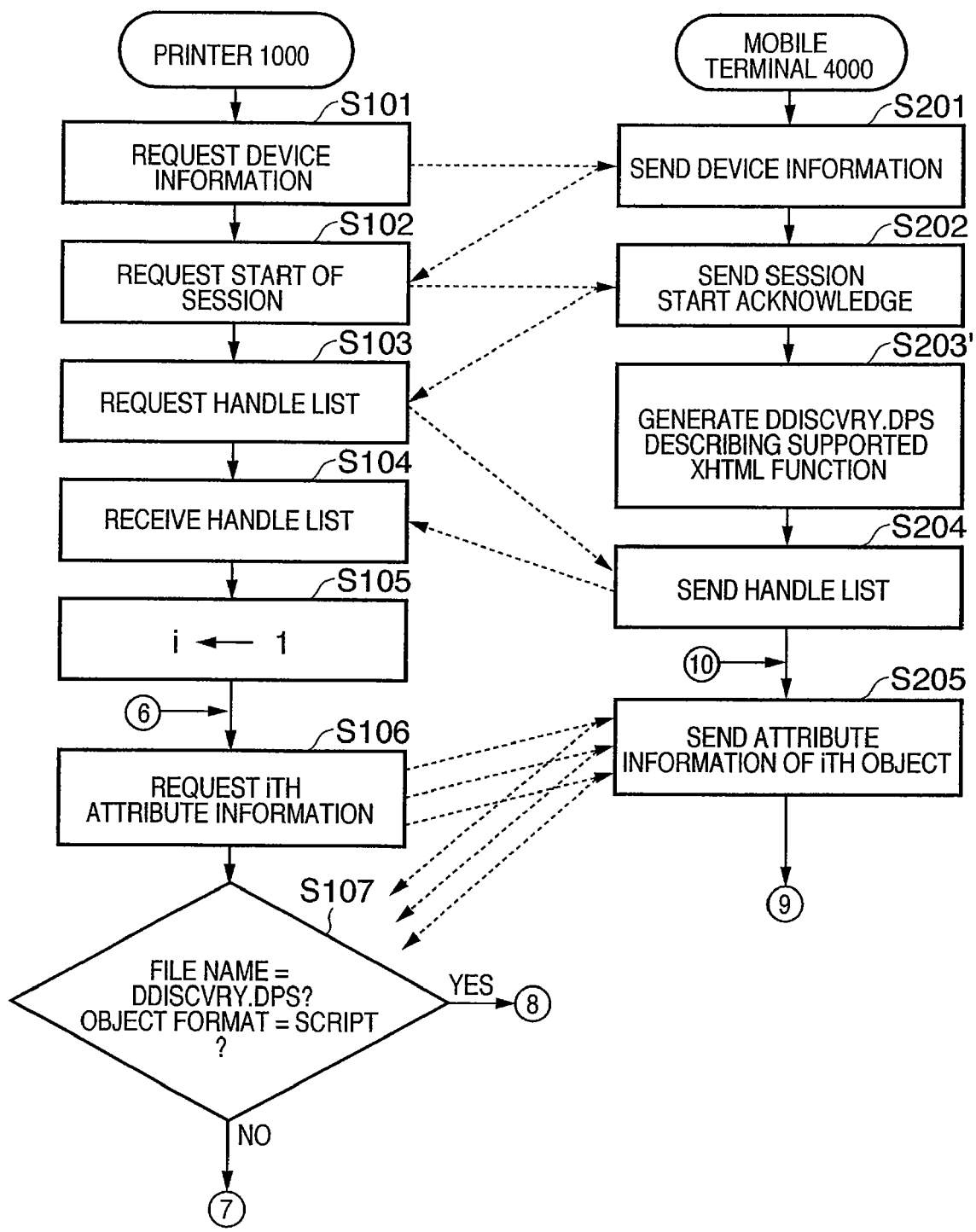
FIGS. 8A and 8B are flowcharts for explaining a procedure of causing the mobile terminal and printer to recognize each other's direct print function and XHTML print function in the direct printing system according to the embodiment of the present invention.
Figure 8B:
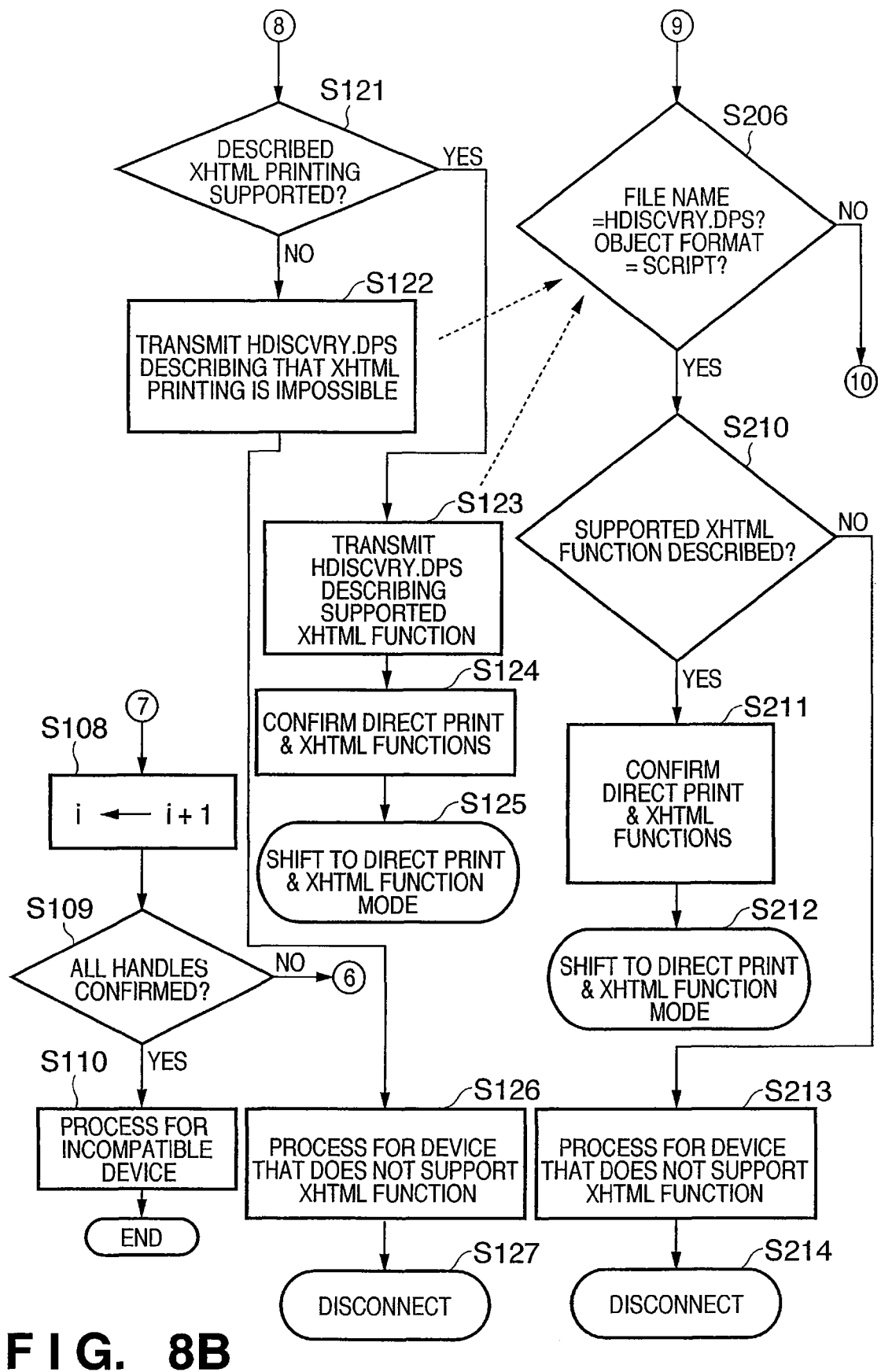

FIGS. 8A and 8B are flowcharts for explaining a procedure of causing the mobile terminal 4000 and printer 1000 to recognize each other's direct print function and XHTML print function in the direct printing system according to the embodiment. The same step numbers as in FIGS. 6A and 6B described above denote the same processes in FIGS. 8A and 8B, and a description thereof will be omitted.

In step S203', the mobile terminal 4000 generates a file "DDISCVRY.DPS" as information indicating that it supports the direct print function. In this case, a list of XHTML functions supported by the mobile terminal 4000 is directly described in "DDISCVRY.DPS".

FIG. 9 is a view showing a description example of supported XHTML functions which are described in the file "DDISCVRY.DPS" by the mobile terminal 4000 according to the embodiment.

A script 911 indicates the start of a description of the XHTML print function. A script 912 indicates whether the mobile terminal 4000 supports a printer font, in which "yes" indicates that when the printer 1000 has a font, the mobile terminal 4000 can output a character code to use it, whereas "no" indicates that even if the printer 1000 has no font, a font held in the mobile terminal 4000 can be rendered and output as image data. A script 913 indicates an XHTML encoding method supported by the mobile terminal 4000. In this example, the description shows that the mobile terminal 4000 supports "UTF-8" and "UTF-16". A script 914 indicates a print mode supported by the mobile terminal 4000, in which "mime multiplex" indicates that the mobile terminal 4000 can encrypt image data, embed it in an XHTML file, and transmit it to the printer, whereas "by reference" indicates that the mobile terminal 4000 can describe the storage location of image data in an XHTML file as a URI identifier. In case of necessity, the printer 1000 acquires the image data from the mobile terminal 4000 based on the URI. A script 915 indicates the version of XHTML supported by the mobile terminal 4000. In this case, the mobile terminal 4000 supports versions "0.95" and "1.0". A script 916 indicates whether the mobile terminal 4000 supports Enhanced Layout of XHTML, in which "on" indicates that the mobile terminal 4000 can output data compatible with Enhanced Layout, and "off" indicates that the mobile terminal 4000 does not support Enhanced Layout. A script 917 indicates the end of the description of the print function.

If data managed by the mobile terminal 4000 includes no XHTML file, or in a mode where the print specifications obviously include no XHTML file, a script indicating incompatibility with XHTML is generated. The script indicating incompatibility with XHTML may be generated in advance. The composition of authentication information changes in this way depending on whether the user wants to print an XHTML file. This prevents the user from determining that a printer which does not support XHTML is incommunicable with a device which supports XHTML.

A list representing the association between file IDs of PTP and URIs as image data storage locations, which is described in "DDISCVRY.DPS" by the mobile terminal 4000, will be described next.

Reference numeral 921 denotes a start of the description about image files. Reference numeral 922 indicates that image data "aaa.jpg" on a server "xxx" is allocated to a file ID "0000001". Reference numeral 923 indicates that image data "bbb.jpg" on the server "xxx" is allocated to a file ID "00000002". Reference numeral 924 indicates that image data "ccc.jpg" on the server "xxx" is allocated to a file ID "00000003". In this way, the mobile terminal 4000 can describe, in "DDISCVRY.DPS", association information between file IDs of PTP and all image data that can be used for printing later. Reference numeral 927 denotes an end of the description about image files.

This file "DDISCVRY.DPS" is generated in step S2031 of FIG. 8A.

In step S107, the printer 1000 receives the attribute information of the object and confirms the contents. In this case, the printer 1000 determines whether the file name of the object corresponding to the value of the variable i is "DDISCVRY.DPS", and the object format is "script". If the result is YES in step S107, the process advances to step S121. In step S121, the printer 1000 determines based on the description of the file "DDISCVRY.DPS" whether the list of XHTML functions supported by the mobile terminal 4000 includes an XHTML function supported by the printer 1000. In addition, the printer 1000 stores the association between image data and file IDs of PTP in preparation for printing later. If no XHTML function supported by the printer 1000 is found in step S121, the process advances to step S122 to generate a file "HDISCVRY.DPS" describing that the printer does not support XHTML printing and transmit it to the mobile terminal 4000. For example, the printer 1000 transmits an empty file "HDISCVRY.DPS" or returns a file with empty scripts corresponding to the XHTML functions requested by the mobile terminal 4000, as indicated by 942, 944, and 946 in FIG. 10B.

FIGS. 10A and 10B are views showing examples of the file "HDISCVRY.DPS" returned from the printer 1000 to the mobile terminal 4000. FIG. 10A shows a response example when wherein the printer 1000 supports XHTML printing. FIG. 10B shows a response example when the printer 1000 does not support XHTML printing.

The process advances to step S126 to show on the operation panel 1010 that the printer does not support the XHTML print function and disconnect USB connection (step S127). After the process for a device incompatible with the XHTML function is executed, the process is ended.

If the printer 1000 supports the XHTML function in step S121, the process advances to step S123. In step S123, the printer 1000 selects XHTML functions supported by it from the XHTML function list described in the file "DDISCVRY.DPS" by the mobile terminal 4000 and describes their list in the file "HDISCVRY.DPS". The file is transmitted to the mobile terminal 4000.

FIG. 10A is a view showing a description example of supported XHTML functions which are described in the file "HDISCVRY.DPS" by the printer 1000 in step S123.

A script 931 indicates the start of a description of the XHTML print function. A script 932 indicates that the printer 1000 has no printer font. A script 933 indicates that the printer 1000 supports the encoding method "UTF-8". A script 934 indicates that the printer 1000 supports the print mode "print by reference". A script 935 indicates that the printer 1000 supports the XHTML version "1.0". A script 936 indicates that the printer 1000 does not support Enhanced Layout of XHTML. A script 937 indicates the end of the description of the XHTML function.

In step S123, the printer 1000 transmits "HDISCVRY.DPS" with the description to the mobile terminal 4000. In step S124, the printer 1000 confirms that both it and the mobile terminal 4000 support the XHTML print function. In step S125, the printer 1000 shifts to a mode supporting both the direct print and XHTML print functions.

In step S206, the mobile terminal 4000 receives the attribute information transmitted from the printer 1000 and confirms the contents. In this case, the mobile terminal 4000 determines whether the file name of the received attribute information is "HDISCVRY.DPS", and the object format is "script". If the result is YES in step S206, the process advances to step S210 to determine whether a list of XHTML functions supported by the printer 1000 is described in the file "HDISCVRY.DPS". If the result is NO in step S210, the process returns to step S213 because the printer 1000 does not support the XHTML functions requested by the mobile terminal 4000. After the process for a device incompatible with the XHTML function is executed by, e.g., displaying that the printer does not support the XHTML print function and disconnecting USB connection, the process is ended.

On the other hand, if the result is YES in step S210, the process advances to step S211. The mobile terminal 4000 confirms that both it and the printer 1000 support the XHTML print function. The process advances to step S212 to shift to the mode supporting both the direct print and XHTML print functions.

In the above-described embodiment, when the mobile terminal 4000 requests direct printing by XHTML of the printer, both the mobile terminal 4000 and printer 1000 recognize the direct print function and XHTML print function. If the mobile terminal 4000 requests normal direct printing without XHTML printing, both devices shift to the normal direct print mode in accordance with the process shown in the flowcharts of FIGS. 6A and 6B described above.

In the above-described embodiment, five functions have been exemplified as detailed functions supported by XHTML. If any other supported function to inform is present, definition is done to allow the mobile terminal 4000 and printer 1000 to understand it between them.

In the above-described embodiment, the exchanged files "DDISCVRY.DPS" and "HDISCVRY.DPS" are described by XML. However, any other form or format can be used if it ensures a description interpretable between the mobile terminal 4000 and the printer 1000.

As explained in FIGS. 7A and 7B, notification of the XHTML print capability can also be done by using a command used in the conventional PictBridge, i.e., "DPS_GetCapability" to acquire Capability. In this case, however, only one-way Capability request from the mobile terminal 4000 to the printer 1000 is possible. Hence, the mobile terminal cannot notify the printer of its Capability. Capability acquisition is possible only when connection of PictBridge is established. In this case, predetermined icons representing completion of connection by a direct print protocol are displayed on both devices. The user may believe a device to support XHTML even when it does not.

According to the above-described embodiment, the user can determine whether a printer supports printing using XHTML before establishing communication connection. Even when a mobile terminal that wants to print by XHTML connects to a printer that does not support XHTML, communication can be disconnected without displaying the icon representing completion of connection on either device. It is therefore possible to notify the user of correct connection information without making him/her mistakenly believe that XHTML is usable.

Detailed information of XHTML support state can be exchanged bidirectionally. The mobile terminal can notify the printer in advance of image file identification information as association between URIs and file IDs of PTP. It is therefore possible to more flexibly print an XHTML file according to the specifications of both devices.

The mobile terminal notifies the printer that it can render a font. Hence, XHTML printing can be executed even when the printer has no font. This obviates a ROM to store font data in the printer and greatly reduces the ROM capacity in the printer.

When the printer notifies the mobile terminal that it supports "print by reference", a buffer to store a plurality of image data in the printer can be omitted. This decreases the ROM capacity in the printer and reduces the cost.

Figure 11:
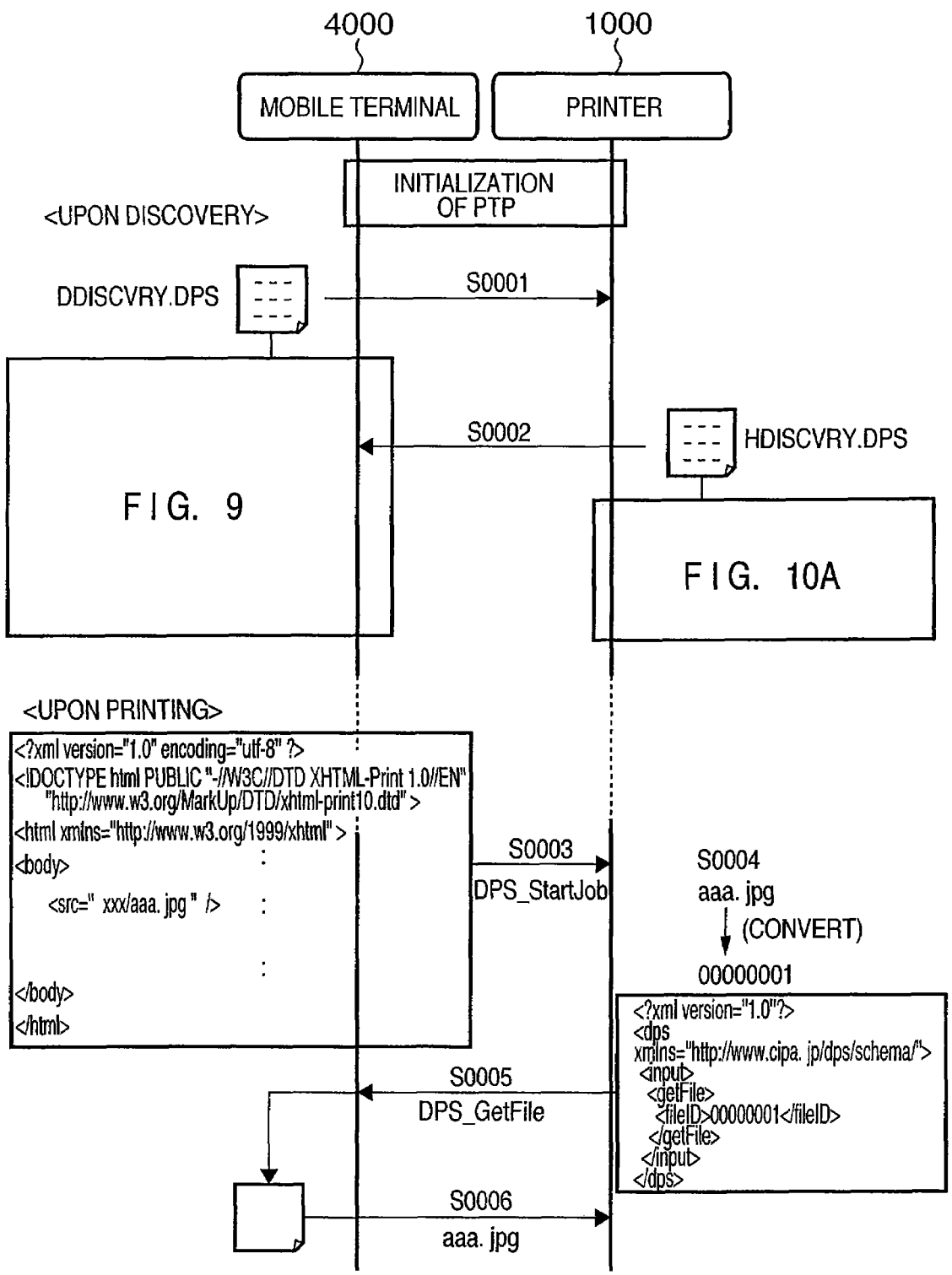
FIG. 11 is a view showing the summary of characteristic features according to the embodiment of the present invention.

FIG. 11 is a view showing the summary of characteristic features according to the above-described embodiment.

When the mobile terminal 4000 connects to the printer 1000, initialization by PTP (Picture Transfer Protocol) is executed. The mobile terminal 4000 and printer 1000 exchange discovery files to authenticate whether they are devices supporting PictBridge before PictBridge connection. More specifically, the mobile terminal 4000 transmits the file "DDISCVRY.DPS" (e.g., FIG. 9) to the printer 1000 (S0001). The printer 1000 checks the function of its own and determines the presence/absence of XHTML print functions requested in the file "DDISCVRY.DPS". The printer 1000 transmits the file "HDISCVRY.DPS" (FIG. 10A or 10B) to the mobile terminal 4000 to notify it of the functions of the printer 1000.

Upon receiving the script shown in FIG. 10A, the mobile terminal 4000 recognizes that the printer 1000 can print in the "print by reference" mode on the PictBridge. The mobile terminal 4000 transmits a print instruction described by an XHTML file to the printer 1000 (S0003). The printer 1000 is notified in step S0001 that an image file "xxx/aaa.jpg" designated by the print instruction corresponds to a file ID "0000001" of PTP. Hence, the printer 1000 converts the URI into the file ID of PTP (S0004). The printer 1000 designates the image data based on the file ID of PTP and acquires the image data from the mobile terminal 4000 (S0005 and S0006).

As described above, the present invention is particularly useful for a digital camera or printer which understands authentication information indicating whether a device supports the direct print function, shifts to a communication mode for direct printing, and displays a predetermined logotype. This is because the devices can recognize each other's XHTML capability before the start of communication for direct printing by notifying each other of the presence/absence of the XHTML print function prior to completion of transmission/reception of authentication information. It is therefore possible to determine based on the presence/absence of the XHTML print function whether communication is enabled before the user is notified of establishment of communication for direct printing. This system is especially convenient for a device which has a direct print function but wishes only XHTML printing. This is because if the user is notified of establishment of communication for direct printing, he/she may misunderstand that communication by XHTML is possible, although only XHTML printing is necessary.

According to this embodiment, user confusion can be prevented by avoiding any situation wherein XHTML printing cannot be executed even when notification that communication has been established normally is given.

XHTML printing has been described above. However, the present invention is also applicable to printing based on any other page description language. The present invention is applicable to any case to notify a device of the presence/absence of print capability about a language that is not specified by a predetermined print protocol. Even in this case, the present invention is effective for a device which displays, e.g., a logotype to notify a user of establishment of authentication by a predetermined communication protocol.

The device is not limited to a digital camera and printer. The present invention is applicable to an information device such as a hard disk player or cellular phone capable of supplying image data.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-051167, filed Feb. 27, 2006, which is hereby incorporated by reference herein in its entirety.

What is claimed is:

1. A printing apparatus which communicates with an image supply device using Picture Transfer Protocol (PTP) and receives image data from the image supply device and prints the image data, the printing apparatus having a function which checks attribute information of a file object managed in the image supply device when initiating a communication with the image supply device, and confirms that the printing apparatus and the image supply device support a direct printing function by transmitting a script in which HDISCVRY.DPS is described to the image supply device, in response to receipt of a script in which DDISCVRY.DPS is described, the printing apparatus comprising:

a reception unit configured to receive a first script in which DDISCVRY.DPS is described from the image supply device;

a transmission unit configured to transmit a second script in which HDISCVRY.DPS and information indicating that the printing apparatus supports an XHTML printing are described to the image supply device, in a case that information indicating that the image supply device supports the XHTML printing and information of a relationship between a file name of an image described in XHTML information and identification information for identifying the image under the PTP are described in the received first script;

a control unit configured to place the printing apparatus in an operation mode that receives XHTML data from the image supply device and prints the XHTML data, after transmitting the second script; and a request unit configured to request for the image to the image supply device by designating the identification information corresponding to the file name of the image described in the XHTML information based on the relationship, when the printing apparatus is placed in the operation mode that prints XHTML data.

2. A printing apparatus according to claim 1, wherein the transmission unit transmits a third script in which HDISCVRY.DPS is described but the information indicating that the printing apparatus supports the XHTML printing does not described to the image supply device, in a case that the information indicating that the image supply device supports the XHTML printing does not described in the first script.

3. An image supply device which communicates with a printing apparatus using Picture Transfer Protocol (PTP) and transmits image data for printing to the printing apparatus, the image supply device having a function which transmits attribute information in which DDISCVRY.DPS is described from among file objects managed in the image supply device when initiating a communication with the printing apparatus, and confirms that the image supply device and the printing apparatus support a direct printing function by receiving a script in which HDISCVRY.DPS is described from the printing apparatus, the image supply device comprising:

a first transmission unit configured to transmit a first script in which DDISCVRY.DPS, information indicating that the image supply device supports an XHTML printing, and information of a relationship between a file name of an image described in XHTML information and identification information for identifying the image under the PTP are described to the printing apparatus;

a reception unit configured to receive a second script in which HDISCVRY.DPS and information indicating that the printing apparatus supports the XHTML printing are described from the printing apparatus, after transmitting the first script;

a control unit configured to place the image supply device in an operation mode that transmits XHTML data for printing to the printing apparatus, after receiving the second script; and a second transmission unit configured to transmit an image having a file name corresponding to the identification information included in a transmission request from the printing apparatus based on the relationship, when the image supply device is placed in the operation mode that transmits XHTML data for printing to the printing apparatus.

4. An image supply device according to claim 3, wherein the control unit controls so as not to perform the XHTML printing, in a case that the information indicating that the printing apparatus supports the XHTML printing does not described in the second script.

\* \* \* \* \*